United States Patent [19]

Rindal

[11] Patent Number: 4,514,763

[45] Date of Patent: * Apr. 30, 1985

[54] SOUND SIGNAL AND IMPULSE NOISE DETECTOR FOR TELEVISION RECEIVERS

[75] Inventor: Abraham E. Rindal, Indianapolis, Ind.

[73] Assignee: RCA Corporation, New York, N.Y.

[*] Notice: The portion of the term of this patent subsequent to Sep. 4, 2001 has been disclaimed.

[21] Appl. No.: 437,826

[22] Filed: Oct. 29, 1982

[51] Int. Cl.³ ............................................. H04N 5/21
[52] U.S. Cl. .................................. 358/167; 358/198; 358/36
[58] Field of Search ............... 358/160, 166, 167, 198, 358/21 R, 36, 37

[56] References Cited

U.S. PATENT DOCUMENTS

| | | | |
|---|---|---|---|
| 2,996,576 | 8/1961 | Dolby | 178/6.6 |
| 4,203,134 | 5/1980 | Christopher et al. | 358/128.5 |
| 4,353,093 | 10/1982 | Durbin et al. | 358/160 |
| 4,470,070 | 9/1984 | Griffis | 358/198 |
| 4,470,071 | 9/1984 | Rindal | 358/198 |

Primary Examiner—Michael A. Masinick
Assistant Examiner—Michael D. Parker
Attorney, Agent, or Firm—Eugene M. Whitacre; Peter M. Emanuel; Lawrence C. Edelman

[57] ABSTRACT

In a television signal processing apparatus, a phase-locked loop (PLL) is provided for detecting the audio information from the television signal and for providing a defect control signal which, when applied to compensation circuitry, reduces impulse noise effects in the video information. The PLL includes a phase detector, a lowpass filter (LPF) and a voltage controlled oscillator (VCO). The phase detector has a first input coupled to be responsive to the frequency modulated sound signal produced by the tuner, a second input coupled to be responsive to the output of the VCO and an output coupled to the LPF. The LPF provides a phase control signal to the VCO and provides the detected audio information. A signal mixer serving as a synchronous detector has first and second inputs coupled to the first and second inputs, respectively, of the phase detector and has an output for providing the defect control signal indicative of the amplitude variations of the frequency modulated sound carrier.

11 Claims, 1 Drawing Figure

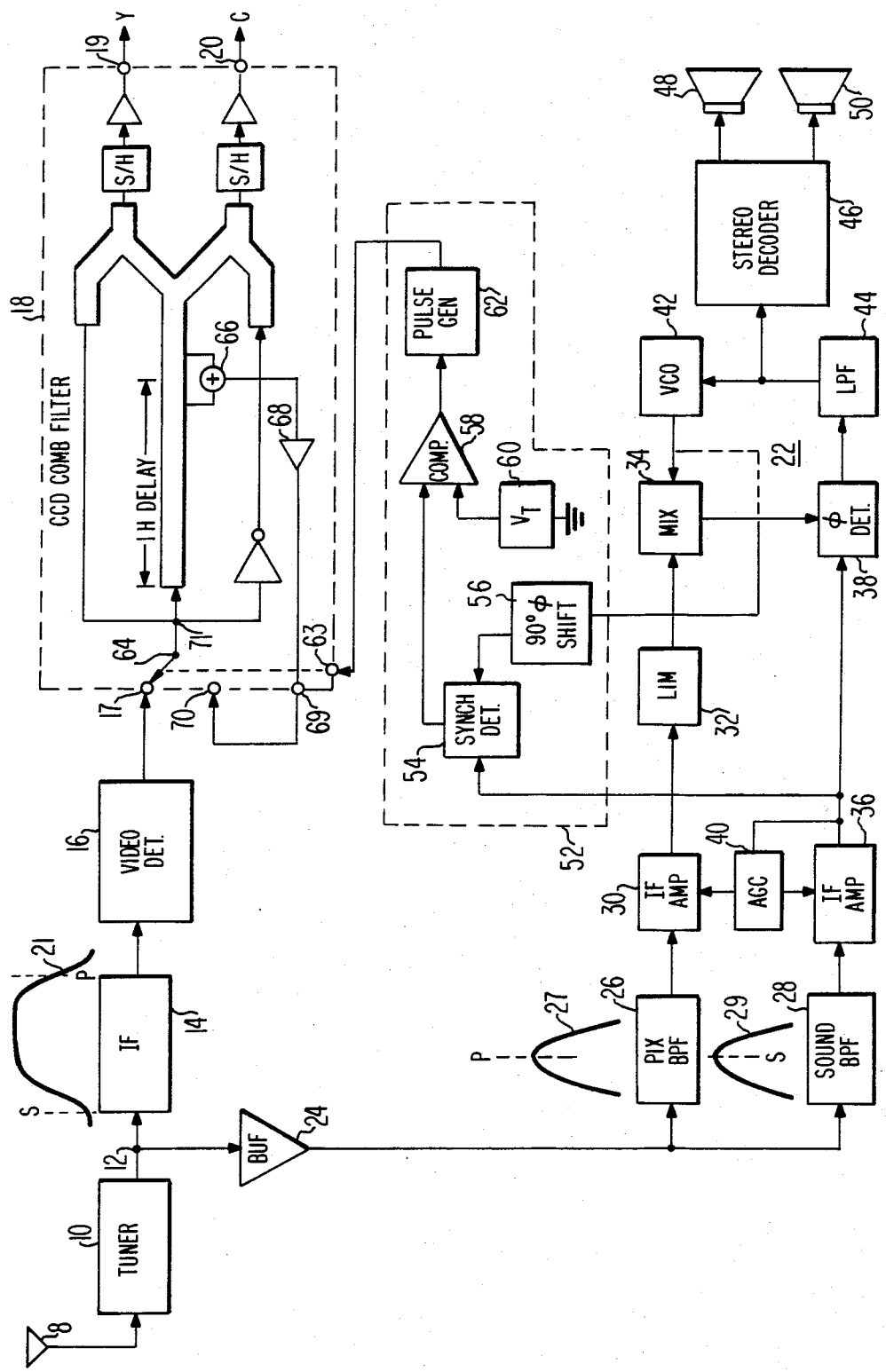

SOUND SIGNAL AND IMPULSE NOISE DETECTOR FOR TELEVISION RECEIVERS

The present invention relates to television detector circuits and more particularly, to a phase-locked loop (PLL) sound signal demodulator arrangement for detecting the television sound signal and indicating the presence of impulse noise in the video signal.

Television receivers are susceptible to signal interference from various sources. The interference may arise as electromagnetic radiation which interferes with the broadcast RF signal. Typical sources of such interference are automotive ignition systems and household motors such as are found in vacuum cleaners and hair dryers, etc. The interference is manifested as bright or dark spots appearing in the TV picture.

Television pictures are formed by a scanning technique in which the image is partitioned into a plurality of horizontal lines. The horizontal lines are sequentially transmitted to the receiver where they are successively reconstructed into the original image on the picture screen. The signal information from image line to image line is highly redundant for a large percentage of images. As described in U.S. Pat. No. 2,996,576 issued Aug. 15, 1961 in the name of R. Dolby, advantage can be taken of this line-to-line signal redundancy to minimize the effect of TV signal disturbances in video recording/reproducing systems such as video tape recorders and video disk systems. Upon detection of a video signal loss, the signal for the preceding image line, which is delayed by one image line period, is substituted for the lost signal to minimize picture disturbance. Detection of signal loss in such recording/reproducing systems is facilitated by the fact that the video signal is recorded as frequency modulation of a carrier. Thus, video signal loss may be detected by detecting the loss of the FM carrier, i.e., by envelope detection of the FM signal. See for example, U.S. Pat. No. 4,203,134 issued May 13, 1980 in the name of T. J. Christopher, et al.

Relatively large numbers of defects in video recording media makes it imperative to include signal compensation systems in video recording/reproducing apparatus. On the other hand, the infrequency of particularly objectionable interference in broadcast TV signals has until recently made it relatively impractical from a cost point of view to include such defect correction systems in TV receivers for eliminating interference. However, with the incorporation of charge transfer device delay lines in TV receivers to perform comb filtering of the luminance signal, it has become practical to consider correcting video interference due to noise impulses. The interference correction can be performed by video signal substitution as in the recording/reproducing systems. However, the detection of noise or defects in the video signal in the TV receiver presents problems different from defect detection in the recording/reproducing systems.

Typically the interference or noise creating the picture disturbance is not of the type (i.e., sufficient amplitude) to cause elimination of the broadcast signal carrier, thus one cannot rely upon envelope detection of the broadcast signal carrier to determine when defects are present in the signal. In addition, the broadcast signal is an amplitude modulated carrier so that amplitude changes are generally not indicative of the presence of noise or signal defects. That is, since the dynamic amplitude range of the baseband video signal is very large, impulse noise can have signal values from barely perceptible to a level that actually overloads the receiver circuits.

In U.S. Pat. No. 4,353,093 issued Oct. 5, 1982 in the name of J. Durbin et al., it is recognized that impulse noise, i.e., noise signals which may supersede the video signal on all or a part of an image line, typically has a broad energy spectrum and causes interference across many TV channels. Therefore, energy from the impulse is likely to be included in the sound component of a particular TV signal even though the sound component of the TV signal is broadcast on a carrier separate from the video signal component of the particular TV signal. Since the sound component of the TV signal is a frequency modulated waveform, amplitude detection of such a signal can be used for effectively detecting the presence of relatively small values of impulse noise.

In the Durbin et al. patent, a phase-locked loop synchronous detector arrangement is responsive to a bandpass filtered version of the modulated sound carrier for detecting amplitude variations of the sound carrier. Compensation circuitry, including a delay line, coupled to the output of the synchronous detector substitutes a prior image line for the present image line in response to the level of the detected amplitude variations. In addition to this phase-locked loop synchronous detector arrangement for detecting impulse noise, conventional intercarrier detection circuitry is required for detecting the audio and video information from the composite TV signal.

In U.S. patent application Ser. No. 412,902, now Pat. No. 4,470,071, entitled TELEVISION SOUND DETECTION USING A FREQUENCY TRANSLATION PHASE-LOCKED LOOP, filed in the name of Abraham E. Rindal on Aug. 30, 1982 and assigned, like the present application, to RCA Corporation, an audio detection system is described for processing a television signal which may include a multichannel audio signal component. In that system, the IF picture carrier provided at the output of the TV tuner is processed in a separate IF channel for developing the video information. Audio information is detected by a frequency translation phase-locked loop (PLL) including a mixer and a phase detector responsive to the IF picture and sound carriers, respectively, provided at the output of the tuner.

In accordance with the present invention a system is provided which detects video signal noise defects and recovers the audio information from a TV signal with a single phase-locked loop circuit arrangement and, which can easily be constructed in integrated circuit form. More specfically, in accordance with the principals of the present invention, the PLL includes a phase detector, a filter and a frequency controlled oscillator for detecting the audio information. The phase detector has a first input coupled to be responsive to a frequency modulated sound signal coupled from a tuner, a second input coupled to be responsive to the output of the controlled oscillator and an output coupled to the filter. The filter couples a control signal to the controlled oscillator for controlling the frequency of the oscillator output signal and for providing audio information at an output terminal. A means for detecting amplitude variations of the frequency modulated sound carrier is provided, having a first input coupled to be responsive to the modulated sound signal, a second input coupled to be responsive to the output of the controlled oscillator and an output for providing a defect control signal to defect compensation circuitry in response to the detected amplitude variations of the modulated sound carrier.

In the drawings

The sole FIGURE is a block diagram of TV receiver circuitry including a preferred embodiment of the present invention.

Referring to the drawing, a television broadcast signal received by an antenna 8 is applied to a tuner 10. Tuner 10 selectively translates the radio frequency (RF) picture and sound carriers of a selected TV channel to respective intermediate frequency (IF) carriers at, e.g., 45.75 MHz and 41.25 MHz, respectively, in the NTSC system. The IF carriers are available at tuner output terminal 12. The IF picture carrier is basically an amplitude modulated (AM) signal containing composite video information. The IF sound carrier, on the other hand, is a frequency modulated (FM) signal. Conventional color television signal processing circuitry including an IF filtering and amplifying channel 14 and a video detector 16 are responsive to the IF picture carrier at terminal 12 for detecting a composite baseband video signal. The baseband video signal is applied to an input terminal 17 of a comb filter 18 which separates the chrominance (C) and luminance (Y) from the composite baseband video signal and provides respective signals at terminals 19 and 20. A more detailed description of comb filter 18 will be provided later on. The luminance and chrominance signals are processed in conventional fashion to develop color signals which are supplied to respective guns of a kinescope (not shown). The resultant electron beams are deflected in successive horizontal image lines to produce an image on the screen of the kinescope in a conventional manner.

IF channel 14 has a conventional passband response 21 in which the IF picture carrier P is located 6 dB down on the higher frequency slope of passband response 21 and the IF sound carrier S is located approximately 25 dB down on the lower frequency slope of passband response 21. As a result, the vestigial sideband video information can be detected without significant interference from the IF sound carrier. Unfortunately, IF passband response 21 induces what is called a "Nyquist" incidental carrier phase modulation (ICPM) to the IF picture carrier, due to its asymmetrical attenuation of the sidebands of the IF picture carrier. In a conventional intercarrier type of sound detection system this Nyquist induced ICPM of the IF picture carrier results in distortion of the intercarrier sound signal due to the process of mixing the IF sound and picture carriers. This distortion of the intercarrier sound signal results in audio buzz. The amount of audio buzz caused by Nyquist ICPM increases in direct relationship with increases in the bandwidth of the audio signal. Thus, when one considers that the bandwidth of a composite audio signal including multiple subcarriers for the transmission of, for example, monophonic, stereophonic and second audio program signals is significantly greater than the bandwidth of the monophonic signal conventionally processed by an intercarrier detector, it becomes apparent that the conventional intercarrier type of audio detection is likely to be unsatisfactory since the audio buzz produced will be substantially increased.

In the present receiver, a frequency translation phase-locked loop (PLL) 22 process the IF sound carrier in a path separate from the IF picture carrier processing circuitry for detecting the audio information to substantially reduce the Nyquist induced ICPM. A buffer amplifier 24 couples the IF picture and sound carriers from terminal 12 to picture and sound bandpass filters 26 and 28, respectively. Picture bandpass filter 26 has a symmetrical, relatively narrow (e.g., a 3 db bandwidth of 1 MHz) passband response 27 centered at the IF picture carrier frequency P (e.g., 45.75 MHz in the NTSC system) for passing substantially only the IF picture carrier signal. An IF amplifier 30 and a limiter 32 appropriately amplify and limit the IF picture carrier signal and apply the resultant limited, and therefore substantially unmodulated, IF picture carrier to one input of a signal mixer 34.

Sound bandpass filter 28 has a symmetrical, relatively narrow (e.g., a 3 db bandwidth of 1 MHz) passband 29 centered at the IF sound carrier frequency S (e.g., 41.25 MHz in the NTSC system) for passing substantially only the IF sound carrier signal and its immediate sidebands which are applied, after amplification by an IF amplifier 36, as one input to a phase detector 38. IF amplifiers 30 and 36 may be similarly configured and each comprise, for example, an integrated circuit IF amplifier such as the TA 7607 manufactured by Tokyo Shibaura Electric Co., Ltd. Limiter 32 may simply comprise parallel connected, oppositely poled Schottky-barrier diodes. A conventional automatic gain control circuit (AGC) 40 is responsive to the output of IF amplifier 36 (or alternatively to the output of amplifier 30) for supplying AGC control voltages to IF amplifier 30 and 36 for controlling their gain so as to establish their output signals at predetermined levels.

A varactor tuned voltage controlled oscillator (VCO) 42 having a nominal oscillation frequency equal to the frequency difference (e.g., 4.5 MHz for the NTSC system) between the IF picture and sound carriers provides a second input to mixer 34. Mixer 34 may comprise, for example, a double balanced analog multiplier circuit, such as the MC1496 available from Motorola Semiconductor Products, Inc., which operates in a switching mode in response to the amplitude limited IF picture carrier (which acts as the switching control signal) for mixing the IF picture carrier signal and VCO output signal to provide at its output a frequency translated signal representing the frequency and phase differences between its input signals. In the NTSC system, the frequency difference between the input signals of mixer 34 is 41.25 MHz. This 41.25 MHz output signal of mixer 34 is supplied as a second input to phase detector 38, which can also comprise an MC1496 integrated circuit. Phase detector 38 provides an output signal having an amplitide which varies in direct relation with the phase difference of its input signals and thus operates as a frequency modulation (FM) demodulator for the FM modulated IF sound signal coupled to its first input from amplifier 36 and provides at its output a composite baseband audio signal (along with undesired signals which result from the detection process). For a more detailed discussion of the operation of analog multipliers as FM demodulators see an article entitled "Applications of a Monolithic Analog Multiplier" by A. Bilotti, in *IEEE Journal of Solid State Circuits*, Dec. 1968, pages 373–380.

A lowpass filter 44 coupled to the output of phase detector 38 filters its output signal to provide a control signal for controlling the frequency of VCO 42. Mixer 34, phase detector 38, VCO 42 and lowpass filter 44 comprise the frequency translation phase-locked loop 22. Lowpass filter 44 has a sufficient bandwidth for selecting the composite baseband audio signal but narrow enough for rejecting the higher frequency undesired signals and supplies the composite audio information signal, for example, to a stereo decoder 46. If stereo programming is provided in the composite audio signal, decoder 46 will decode the composite audio signal and provide left and right stereo signals to speakers 48 and 50, respectively. If stereo programming is not provided, decoder 46 will provide the monophonic signal to the speakers.

In operation, mixer 34 frequency translates the IF picture carrier signal applied at its input and provides an output signal having a frequency corresponding to the difference of the frequencies of its input signals (e.g., 41.25 MHz). Undesired output signals corresponding to feedthrough of the input signals and the sum of the input signals are attenuated by the relatively narrow bandwidth of lowpass filter 44. The amplitude of the output voltage of phase detector 38 is a measure of the phase difference between its input signals. This output voltage is filtered and applied by lowpass filter 44 as a control voltage to VCO 42. The frequency of the output signal of VCO 42, and consequently the 41.25 MHz translated signal from mixer 34, changes in direct relation to the amplitude of the control voltage and is in a direction for reducing the phase difference between the signals at the inputs of phase detector 38. When the phase of the input signals of detector 38 are in quadrature (90°), a minimum amplitude control voltage is applied to VCO 42. Therefore, due to the feedback nature of loop 22, when it is locked, the control voltage at the output of filter 44 is such that the frequency of the translated difference signal at the output of mixer 34 is equal to the average frequency of the IF sound carrier and its phase is in quadrature in relation to the phase of the IF sound carrier. Thus, phase detector 38 acts as an FM detector for frequency demodulating the IF sound carrier to produce a signal which, when filtered by filter 44, corresponds to the audio information.

Since mixer 34 is also responsive to the picture carrier signal, any common mode FM which may be imparted to both the picture and sound carrier by, e.g., the local oscillator of tuner 10 or television accessories such as a cable television converter which may precede tuner 10, is transferred by mixer 34 to the frequency translated signal and therefore cancelled in phase detector 38.

As previously noted, the frequency modulated sound carrier is selected from the output of tuner 10 by bandpass filter 28 and amplified by amplifier 36. Amplifier 36, controlled by AGC circuit 40, conditions the sound carrier so as to have a constant long term average amplitude, and tends to remove normally occurring amplitude fluctuation not associated with noise. The time constants of AGC system are not sufficiently fast so as to limit the occurrence of amplitude fluctuations due to impulse noise. Thus, except for impulse noise induced amplitude fluctuations, the amplitude of the modulated sound carrier is substantially constant. Since PLL's are relatively insensitive to amplitude fluctuations, a limiter is not required between amplifier 36 and detector 38 for eliminating the impulse noise fluctuations.

Consequently, the output of amplifier 36 is an advantageous point for detecting amplitude fluctuations of the modulated sound carrier for deriving a defect control signal and for reducing impulse noise induced video signal defects. Additionally, since the bandwidth of filter 28 is wide enough to pass the sound carrier and some of its sidebands, it presents as relatively shorter signal delay than the delays in the video signal path and allows sufficient time for video signal defect compensation. A defect control signal generating circuit 52 including a synchronous detector 54 for detecting the impulse noise induced fluctuations can be advantageously incorporated with the structure of the previously described PLL by the addition of a minimum number of parts and in a manner easily incorporated with the structure of the audio detector PLL, desirably in integrated circuit form.

Since the output signal of mixer 34 has a frequency equal to the average frequency of the frequency modulated sound carrier but has a quadrature phase, a 90° phase shift network 56, shifts the output signal of mixer 34 90° and applies it to one input of synchronous detector 54. Thus, when the FM sound carrier is applied to the other input of detector 54, the phase of its input signals are in synchronism (i.e., in phase alignment) with each other and thus synchronous detector 54, in a well known manner, detects the amplitude variations of the FM sound carrier. Detector 54 may also comprise e.g., a double balanced multiplier such as found in the prior noted MC 1496 integrated circuit.

The amplitude variations produced at the output of detector 54 are applied to a first input terminal of comparator circuit 58. A DC threshold signal from source 60 is applied to a second input of comparator 58. The comparator produces an output state change whenever the output signal of detector 54 passes through the threshold level. The output signal of detector 54 will be a slowly varying AC signal having a relatively small amplitude except when impulse noise or other dramatic signal distrubance occurs, in which case there will be a relatively large, fast output signal change which may go positive or negative in direction due to ringing associated with e.g., noise impulse interaction with the RF circuitry of tuner 10. Thus, it may be desirable to include a second comparator circuit arranged with a threshold of opposite polarity in order to detect synchronous detector output signal excursions of either polarity. Still further, two comparators may be logically interconnected to produce an output signal only for a response known to be correlated to an impulse noise ringing characteristic.

The comparator output signal is conditioned by pulse generator 62 and applied via terminal 63 to enable/disable a switch 64 for affecting video signal substitution within comb filter 18. Pulse generator 62 may be a monostable multivibrator which generates a pulse of prescribed amplitude and duration (typically in the range of 1-10 microseconds). Test data indicates that impulse noise duration is generally grouped in the 1-3 microsecond range, and a three microsecond control pulse is sufficient to compensate for the majority of noise impulses. On the other hand, it may be desirable to terminate video substitution at a specified time each interval, for example, during the horizontal blanking period. In this case the pulse generator may be an edge triggered flip-flop, triggered on (set) by the comparator output signal and off (reset) by a separate timing pulse, e.g., the horizontal synchronization pulse.

Comb filter 18 is realized with charge transfer device technology and includes a charge coupled device (CCD) including a 1-H (one horizontal image line) delay line integral with CCD summing sections and sample and hold (S/H) circuitry to accomplish the requisite transversal filter function to comb the vido signal for separation of the interlaced luminance (Y) and chrominance (C) signals as is described in U.S. Pat. No. 4,158,209 issued June 12, 1979 in the name of P. A. Levine. The CCD delay line is actually a plurality of serially connected storage elements from which sampled data is successively translated from one element to the next element at a predetermined rate. The signal may be non-destructively tapped from any one or more of these storage sites in order to realize a particular signal delay. An adder 66 averages two samples of the video signal that are tapped one-half of a chrominance subcarrier cycle before and after a 1-H delay. The tapped and delayed signal is conditioned by adder 66 to have its chrominance signal shifted 180° (one-half of a chrominance subcarrier cycle) with respect to the untapped delayed signal remaining in the CCD device in order that the tapped and delayed signal will have the proper chrominance phase to serve as a substitution signal. A 1-H delayed signal is available at the output of adder 66 and is applied to terminal 69 via amplifier 68. The signal available at terminal 69 is then coupled to comb filter input terminal 70. For a more detailed description of the circuitry for phase inverting the chrominance signal see U.S. Pat. No. 4,272,785 issued June 9, 1981 to J. S. Fuhrer. By way of example, comb filter circuit 18 is available from Tokyo Shibaura Co., Ltd., Japan, as the T 3928 integrated circuit.

Real time video signal is applied to terminal 17 of the comb filter and then applied to input connection 71 of the CCD register via the switch 64. If signal defects, i.e., noise, have been determined to be present in the real time signal, the 1-H delayed signal from terminal 69 is temporarily substituted for the real time signal supplied from video detector 16 by positioning the switch 64 to access the 1-H delayed signal applied to comb filter input terminal 70. Thus, the signal previously delayed by one horizontal image line is recycled in the CCD register.

The foregoing demonstrates an advantageous technique of substituting delayed signal for real time signal in the video signal processing path of a color receiver utilizing a particular type of comb filter. An alternative arrangement for use in black and white TV receivers may comprise a simple 1-H delay line and a switch. In that case, the delay line has its input terminal connected for receiving a real time video signal and the switch selectively applies either the real time signal, or the 1-H delayed signal from the delay line directly to the further processing circuitry. In this type of arrangement, the video signal does not recycle in the delay line but merely pases through once subject to being delayed one image line. For a color signal, a delay corresponding to an integral number of horizontal line periods may also be used to effect the same basic result. For example, for an NTSC color signal, the delay circuit may comprise a 2-H delay line, in which case it is unnecessary to invert the phase of the chrominance component of the video signal in order that the chrominance component will have the proper phase to serve as the substitute signal.

Thus, what has been described is a system in which impulse noise or defect detection in the video signal is advantageously performed in conjunction with a PLL sound signal detector for detecting the audio information. While separate IF amplifiers 30 and 36 are used in the embodiment shown in the FIGURE, a common IF amplifier can be used for amplifying the IF picture and sound carrier signals provided at the output of buffer 24, such as described in copending U.S. patent application Ser. No. 412,898, now Pat. No. 4,470,070, entitled "FREQUENCY TRANSLATION PHASE-LOCKED LOOP SOUND DETECTION SYSTEM UTILIZING A SINGLE IF AMPLIFIER" filed Aug. 30, 1982 in the name of P. D. Griffis and assigned, like the present application, to RCA Corporation. Also, the NTSC frequencies mentioned herein are merely illustrative and can be appropriately scaled for operation at other frequencies in the NTSC, PAL or SECAM television systems.

Additionally, although PLL 22 is shown including mixer 34 for deriving the 41.25 MHz frequency translated signal for application to phase detector 38 and synchronous detector 54, the nominal frequency of the VCO output signal could be changed to the same frequency as the sound carrier frequency and be coupled directly to detectors 38 and 54, such as shown by the dashed line in the FIGURE, without being frequency translated by mixer 34. Of course, in this alternative embodiment, mixer 34 is omitted and would not be available to eliminate any common mode FM of the picture and sound carriers.

Furthermore, it should be understood that although in the described embodiment the defect control signal is used for controlling the substitution of delayed video signal, the defect control signal could be used in conjunction with other noise suppression or compensation circuitry. For example, the defect control signal could be used to render the automatic gain control system of the television receiver insensitive to noise impulses (impulse noise) in the video signal.

What is claimed is:

1. In a television system including a source of an intermediate frequency (IF) signal comprising an IF picture carrier amplitude modulated with video information and an associated IF sound carrier frequency modulated with audio information, having processing circuits for detecting said video information, and having compensation circuitry responsive to a defect control signal for reducing effects of noise in said picture carrier, apparatus for detecting said audio information and for providing said defect control signal comprising:

a controllable oscillator responsive to an oscillator control signal coupled to an oscillator control input and having an output at which is provided a controlled frequency output signal;

a frequency translation circuit having a first input coupled to be responsive to said IF picture carrier, a second input coupled to be responsive to said oscillator output signal, and an output for providing a frequency translated signal;

a phase detector having a first input coupled to be responsive to said IF sound carrier, a second input coupled to be responsive to said frequency translated signal, and an output;

lowpass filter means coupled between the output of said phase detector and the control input of said controllable oscillator for providing said oscillator control signal and for providing said audio information;

a synchronous detector having a first input coupled to be responsive to said sound carrier, a second input coupled to be responsive to said frequency translated signal, and an output for providing detected amplitude variations of said sound carrier indicative of the presence of noise in the picture carrier; and control circuitry coupled to the output of said synchronous detector for providing said defect control signal whenever said detected amplitude variations exceed a predetermined threshold.

2. The apparatus of claim 1 further including:

gain controlled amplifier means coupled between said source of IF signal and said first input of said synchronous detector, said gain controlled amplifier means having a relatively slow gain control time response for maintaining the long term average amplitude of said modulated sound carrier substantially constant, but not substantially reducing the amplitude variations due to noise.

3. The apparatus of claim 2 wherein:

said frequency translation circuit, said phase detector and said synchronous detector each comprise an analog multiplier circuit.

4. In a television system including a source of an intermediate frequency (IF) signal comprising an IF picture carrier amplitude modulated with video information and an associated IF sound carrier frequency modulated with audio information, having processing circuits for detecting said video information, and having compensation circuitry responsive to a defect control signal for reducing effects of noise in said picture carrier, apparatus for detecting said audio information and for providing said defect control signal comprising:

a phase-locked loop having a phase detector, filter means and a frequency controlled oscillator, said phase detector having a first input coupled to be responsive to said frequency modulated sound signal, a second input coupled to be responsive to an output signal of said controlled oscillator and an output coupled to said filter means, said filter means coupling a control signal to said controlled oscillator and providing at an output terminal said audio information; and means for detecting amplitude variations of said frequency modulated sound carrier, having a first input coupled to be responsive to said modulated sound carrier, a second input coupled to be responsive to said output signal of said controlled oscillator and an output for providing said defect control signal to said compensation circuitry in response to said detected amplitude variations of said frequency modulated sound carrier.

5. The apparatus of claim 4 wherein said means for detecting amplitude variations comprises a synchronous detector.

6. The apparatus of claim 5 further including:

gain controlled amplifier means coupled between said source of IF signal and said synchronous detector, said gain controlled amplifier means having a relatively slow gain control time response for maintaining the long term average amplitude of said modulated sound carrier substantially constant, but not substantially reducing the amplitude variations due to noise.

7. The apparatus of claim 5 wherein said synchronous detector includes:

a mixer having a first input coupled to said first input of said phase detector and a 90° phase shift network coupled between a second input of said mixer and said second input of said phase detector.

8. The apparatus of claim 7 wherein said means for detecting amplitude variations further includes:

a source of substantially constant reference signal; and a comparator having a first input for receiving said constant reference signal, and a second input for receiving amplitude variations detected by said synchronous detector, said comparator generating an output signal whenever said detected amplitude variations exceed the constant reference signal.

9. The apparatus of claim 8 wherein said means for detecting amplitude variations further includes circuitry, responsive to the comparator output signal, for generating at an output terminal said defect control signal having a predetermined amplitude and duration.

10. The apparatus of claim 4 wherein said phase-locked loop further includes a frequency translation circuit coupled between said frequency controlled oscillator and said second input of said phase detector, said frequency translation circuit being responsive to said IF picture carrier for frequency translating said oscillator output signal to the frequency of said IF sound carrier.

11. The apparatus of claim 10 wherein said frequency translation circuit, said phase detector and said mixer each comprise an analog multiplier.

* * * * *